United States Patent [19]
Lumadue

[11] 3,751,734
[45] Aug. 14, 1973

[54] DRAIN TRAP
[76] Inventor: Robert B. Lumadue, R.D. No. 2, Clearfield, Pa. 16830
[22] Filed: May 21, 1971
[21] Appl. No.: 145,637

[52] U.S. Cl. .................................. 4/197, 4/206
[51] Int. Cl. ....... E03c 1/28, E03c 1/282, E03c 1/22
[58] Field of Search ...................... 4/189, 190, 197, 4/206

[56] References Cited
UNITED STATES PATENTS

| | | | |
|---|---|---|---|
| 309,819 | 12/1884 | Colahan | 4/197 |
| 337,126 | 3/1886 | Bower | 4/197 |
| 441,691 | 12/1890 | McClellan | 4/206 UX |
| 464,327 | 12/1891 | Kennedy | 4/197 |

FOREIGN PATENTS OR APPLICATIONS

| | | | |
|---|---|---|---|
| 719,196 | 11/1931 | France | 4/206 |
| 372,456 | 5/1932 | Great Britain | 4/206 |
| 482,598 | 4/1938 | Great Britain | 4/206 |
| 717,648 | 10/1931 | France | 4/206 |
| 1,116,514 | 2/1956 | France | 4/190 |
| 671,257 | 2/1939 | Germany | 4/197 |
| 1,658,202 | 10/1970 | Germany | 4/206 |
| 318,419 | 6/1934 | Italy | 4/206 |

Primary Examiner—Wayne A. Morse, Jr.
Assistant Examiner—Donald B. Massenberg
Attorney—Shaffert and Miller

[57] ABSTRACT

Disclosed is an improved drain trap for use in plumbing installations characterized by ease of installation and resistance to evaporation of the water contained therein and constructed of a series of concentric, coaxial cylindrical members in telescoped relationship to each other thereby providing a tortuous flow drain path, an enlarged water reservoir and an easily cleaned sediment trap.

7 Claims, 5 Drawing Figures

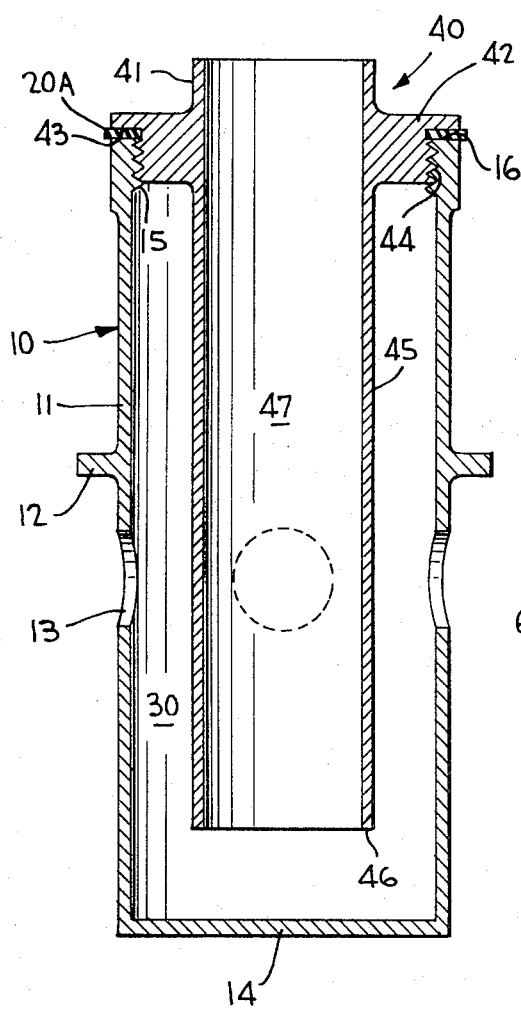
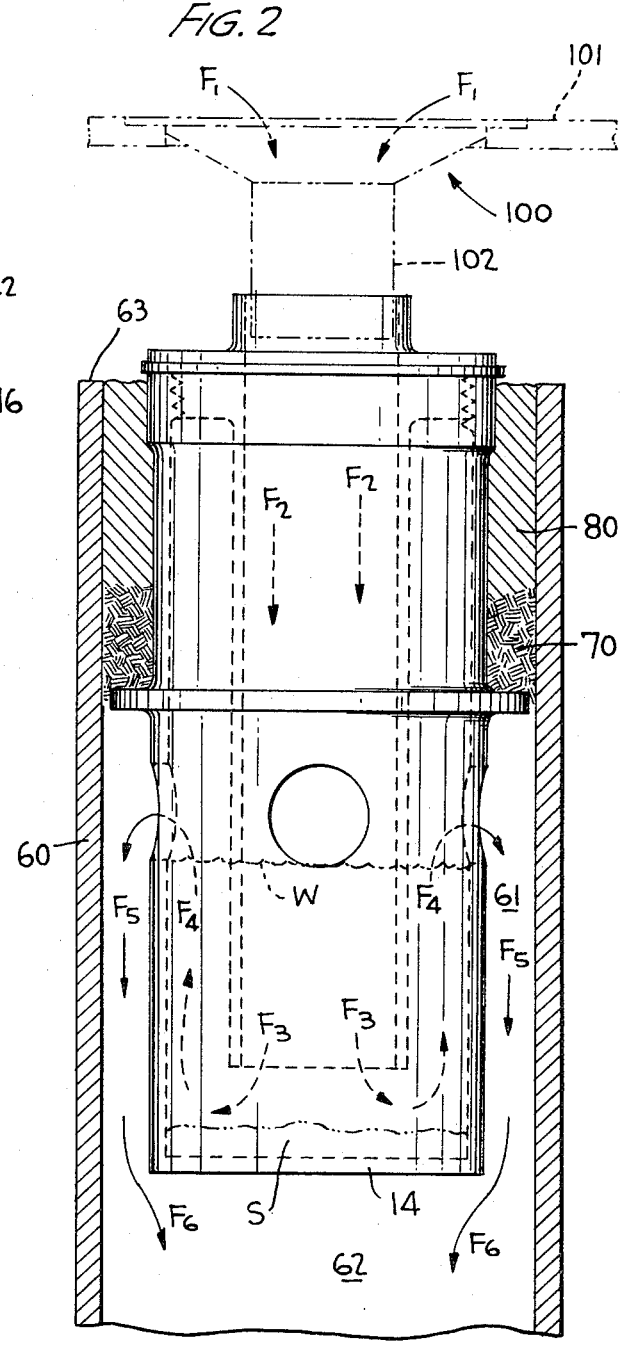

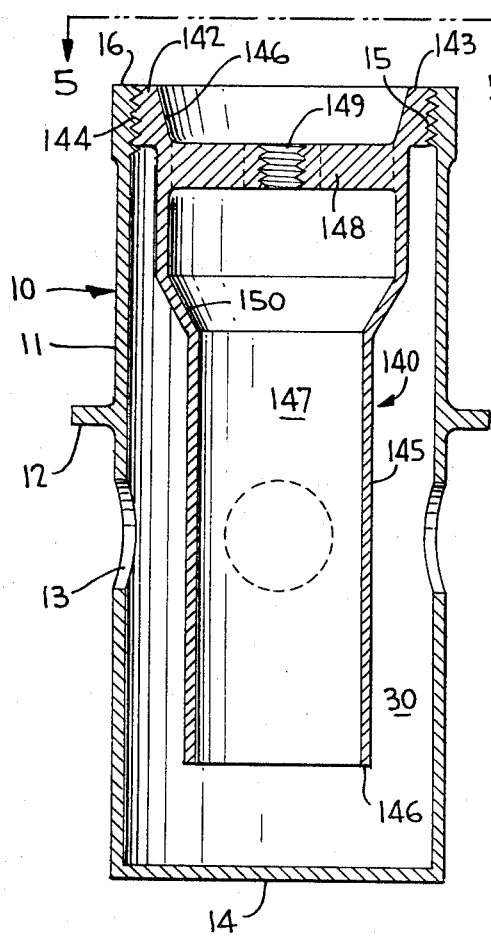
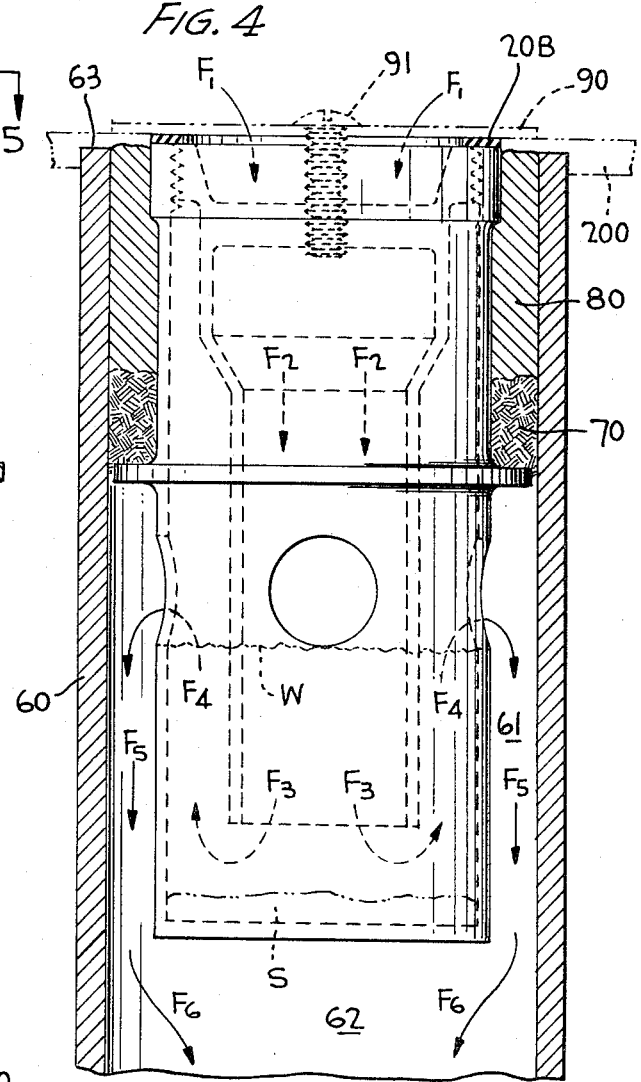
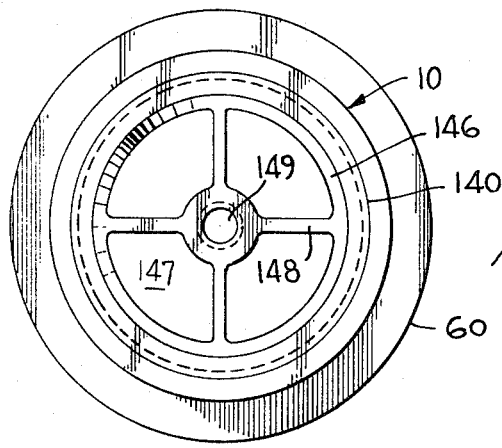

3,751,734

DRAIN TRAP

BACKGROUND OF THE INVENTION

Many plumbing applications require a drain trap that will trap solid and particulate matter and act as a barrier against the back-up of unpleasant odors.

The most commonly known drain trap is the familiar U-shaped trap installed under many sinks and basins. The drain pipe leading from the basin curves back upon itself and then curves once again to continue in its original path to form a trap in the shape of a U. Because water seeks its own level, the U-shaped portion of the trap remains full of water and provides a barrier against the back-up of odors and the like. To enable the trap to be cleaned or to remove items trapped by the drain trap, the U-shaped portion of the trap is generally removable or it has a removable plug at its lowermost portion.

While the U-shaped drain trap is suitable for exposed installations such as below a basin, other types of installations require different types of traps.

Below floor traps are most common in such applications as basement floor drains, shower floor drains and the like. Once traps for these applications are installed, the access to the trap for cleaning or repair is limited. From a practical standpoint, access to the trap should be through the drain hole in the floor rather than from the side (such as is possible with the U-shaped trap discussed above) to avoid destruction of the floor itself.

Certain types of traps have been used in the past for under floor installations with the most common type of trap being known as a "bell" trap. The trap itself is in the shape of a shallow bell. These bell traps have proved unsatisfactory for a number of reasons. For example, the volume of water retained in the trap as an odor barrier is very small and quickly evaporates. As another example, the bell trap is unsuitable for any application other than an open grate in a floor type drain. The common bell trap is not designed in a manner that would permit it to be attached to a drain pipe leading from above the trap.

Thus, drain traps that have been used in the past have disadvantages affecting their installation, utility or repair and have not been fully satisfactory for their intended purpose.

SUMMARY OF THE INVENTION

The drain trap constituting the present invention is characterized by a series of concentric, co-axial cylindrical members positioned in a telescoped relationship to each other. A flow path is provided by the spaces within and between the cylindrical members. Additionally, provisions are made for a portion of the structure to act as a sediment trap for solid and particulate matter.

One of the cylindrical members has a closed bottom which serves as the above-mentioned sediment trap but also enables the trap to retain a water reservoir that acts as an odor barrier. The reservoir is large enough to compensate for normal evaporation.

The innermost cylindrical member is easily removed so that the trap may be cleaned and any sediment buildup removed. Access to the removable insert is from the top of the trap.

Simple means are provided to permit the trap to be installed in standard cast iron, plastic, terra-cotta or transite pipe. Additionally, easily replaceable gaskets are provided to insure a good seal between the trap and the surrounding floor structure.

One embodiment of the invention provides a removable insert or cylindrical member that is suitable for use in a typical floor drain assembly. Provisions are made for the attachment of a floor grate or strainer or, in the alternative, a removable fluid stopping plug.

Another embodiment of the invention provides a different removable insert that is adapted for attachment to a drain pipe leading from some other drain. A trap of this type is particularly useful in bathroom shower stall applications.

BRIEF DESCRIPTION OF THE DRAWING

FIG. 1 is a cross sectional elevation view of a first embodiment of the drain trap of the present invention.

FIG. 2 is a view partially in section showing the drain trap of FIG. 1 installed in a drain pipe.

FIG. 3 is a cross sectional elevation view of a second embodiment of the drain trap of the present invention.

FIG. 4 is a view partially in section showing the drain trap of FIG. 3 installed in a drain pipe.

FIG. 5 is a top view of the drain trap taken on line 5—5 of FIG. 3.

DESCRIPTION OF A PREFERRED EMBODIMENT

A first embodiment of the drain trap of the present invention may be more clearly understood with specific reference to FIG. 1. The drain trap itself consists of a housing assembly 10, a removable insert 40, and a resilient gasket 20A. Housing assembly 10 is a cylindrical member characterized by a housing assembly wall 11, a housing assembly flange 12 protruding from wall 11 approximately mid-way between the ends of housing assembly 10, a plurality of housing assembly drain holes 13 spaced around the circumference of housing assembly 10, and a housing assembly lower wall 14. With particular reference to FIG. 1, the upper end of housing assembly 10 is open and has screw threads 15 formed thereon. The uppermost surface 16 of housing assembly 10 forms a seal surface for cooperation with gasket 20A.

Thus, it can be seen that housing assembly 10 generally may be described as a cylindrical container having a closed bottom and an open top and having a plurality of drain holes passing through the wall of the container at spaced locations around the circumference of the container.

Housing assembly 10 may be machined, cast, or molded from appropriate materials such as brass, bronze, suitable plastics, or other appropriate corrosive-resistant material.

Located within housing assembly 10 is removable insert 40. Removable insert 40 is removably attached to housing assembly 10 by means of screw threads 44 which are formed on removable insert web 42. Screw threads 44 mate with screw threads 15 on housing assembly 10. Removable insert seal surface 43 is also formed on web 42 on a portion of web 42 that substantially matches the diameter of housing assembly 10. In this manner, seal surface 43 is opposed to housing assembly seal surface 16 and, when removable insert 40 is screwed into housing assembly 10, gasket 20A will be engaged by seal surfaces 16 and 43 to provide a fluid tight seal between the two elements.

Removable insert 40 is generally cylindrical in shape and has a cylindrical connecting flange 41 extending upwardly from web 42. Cylindrical wall 45 extends downwardly from web 42 and terminates at removable insert lower surface 46. Removable insert 40 is open at both ends and lower surface 46 is spaced a sufficient distance from housing assembly lower wall 14 to permit fluid flow through the trap even when sediment accumulates on the bottom surface of housing assembly 10. Fluid flowing through the drain trap of FIG. 1 enters the trap through connecting flange 41, down through first fluid passage 47, around removable insert lower surface 46, up through second fluid passage 30 (which is formed between the outer surface of wall 45 and the inner surface of wall 11), and then through the plurality of housing assembly drain holes 13.

The drain trap of FIG. 1 is suitable for installation in, for example, a shower stall. Such an installation is illustrated in FIG. 2. The drain trap is positioned within standard drain pipe 60. Drain pipe 60 is conventional drain piping of standard size and is usually manufactured from cast iron, plastic, terra-cotta, or the like.

Housing assembly 10 is positioned within pipe 60 and, while being held in place, is wedged therein by the insertion of oakum 70 between the outer surface of wall 11 and the inner surface of pipe 60. After oakum is wedged into the space between the drain trap and the pipe, a hardenable sealing material 80 is poured into the space between the pipe and the drain. This material may be poured lead, cement, epoxy or other suitable material. After the hardenable sealing material sets, a waterproof plug is formed in the space defined by the inner surface of pipe 60, the outer surface of wall 11 and the upper surface of flange 12.

Removable insert connecting flange 41 is adapted to be connected to shower drain connecting pipe 102. Shower drain assembly 100 is shown schematically in FIG. 2 with surface 101 representing the floor of the shower. A suitable strainer or grate would be placed across the drain hole in floor 101 to complete the installation.

The flow path of fluid passing through the drain trap was originally described with reference to FIG. 1. To continue the discussion of the flow path once the drain trap is installed, reference may be made to FIG. 2 wherein the fluid passes through space 61 after it issues from drain hole 13 and continues until it finally reaches the main drain pipe fluid passage 62. A series of arrows numbered $F_1 - F_6$ are drawn in FIG. 2 to sequentially illustrate the flow path of fluid beginning with the shower floor and ending with the drain passage 62.

The bottom portion of housing assembly 10 forms a trap for sediment S, visible in FIG. 2. Additionally, the closed bottom end of housing assembly 10 allows water to be retained in the drain trap up to water level W which corresponds to the lowermost portion of drain holes 13. Because the lower surface 46 of removable insert 40 is located below water level W, this reservoir of water provides an effective barrier to the back-up of unpleasant odors and the like.

A second embodiment of the drain trap of the present invention is illustrated in FIGS. 3-5. It is noted that housing assembly 10 is the same element for both embodiments of the present invention. Consequently, like reference numerals have been used to refer to the various portions of housing assembly 10 of FIGS. 3 and 4.

Removable insert 140 of the second embodiment has been modified so that this drain pipe is suitable for installation in a typical floor drain type assembly.

Removable insert 140 has formed at its upper end a web 142 with screw threads 144 formed thereon. Screw threads 144 mesh with housing assembly screw threads 15 when removable insert 140 is installed inside the housing assembly. Upper surface 143 of web 142 forms a sealing surface that will be in the same plane as housing assembly seal surface 16 after removable insert 140 is screwed into the housing assembly. Seal surfaces 16 and 143 then cooperate to present a lower sealing surface for a sealing gasket 20B (FIG. 4). Inner surface 146 of web 142 converges slightly towards the direction of the interior of the drain trap and, in certain applications, it provides the seating surface for a conventional rubber sealing plug. Alternatively, a conventional strainer 90 (FIG. 4) may be attached by means of screw 91 to a screw hole 149 formed through the intersection of a plurality of strainer webs 148 (FIG. 5). Strainer 90 will, under normal circumstances, be flush or may slightly overlap floor 200. Gasket 20B is gripped between strainer 90 and the sealing surfaces provided by surface 16 and 143. The diameter of strainer 90 may be chosen to fit within pipe 60 or may overlap the end 63 of pipe 60 as well as a portion of floor 200.

Removable insert 140 also has a cylindrical wall 145 characterized by an open lower end and lower surface 146. If desired, wall 145 may be constricted as at 150 to accommodate both a sufficient drain area surrounded by 146 and a sufficient second fluid passage 30. As in the first emboidment of the drain trap of the present invention, the flow path of the liquid passing through the trap is sequentially indicated by arrows numbered $F_1 - F_6$.

It is noted that the drain trap of the present invention may be easily cleaned because the removable insert 40 or 140 may be unscrewed from housing assembly 10 and lifted out of the drain trap. In this manner, sediment S that has collected in the lower portion of housing assembly 10 may be removed.

The size of the odor trap water reservoir in the present invention is substantially larger than the reservoirs in previously used drain traps. For example, the reservoir in the drain trap of the present invention will last and function as an effective odor barrier approximately six times longer than the reservoir in the previously discussed bell trap (assuming a constant rate of evaporation).

EXAMPLE

A drain trap according to the teachings of this invention has been constructed from cast brass. Although dimensions may be varied to meet the requirements of various applications, the following dimensions have been used in the manufacture of a drain trap that will fit into a standard 4 inch diameter soil pipe. The outside diameter of housing assembly was made to be 3¼ inches and ⅛ inch walls permitted the interior diameter to be 3 inches. The overall height of the housing assembly was made to be 7¼ inches and holes 13 were made 1 inch in diameter and were located 2¾ inches from the bottom surface of the housing assembly. The removable insert was made with an interior diameter of 1½ inches and had ⅛ inch thick walls. The length of the removable insert employed in the second embodiment of the drain trap was 6¼ inches so that the lower end 146 would be spaced approximately 1 inch from housing assembly lower wall 14. The removable insert of the first embodiment would have a length that varied according to the length of connecting flange 41, but the spacing between surface 46 and surface 14 would be approximately the same as the equivalent distance in the second embodiment. Housing assembly flange 12 was spaced approximately 3 inches from the top surface of housing assembly 10 so that the total depth of the oakum and poured sealing material would be approximately 3 inches from floor to flange. These dimensions have been found suitable for standard installations but, as is apparent, different dimensions may be employed according to the demands of the particular installation.

It should be apparent that the present invention may be embodied in other specific forms without departing from the spirit or essential attributes thereof, all of which are intended to be encompassed by the appended claims.

I claim:

1. A drain trap comprising a generally cylindrical hollow housing assembly located concentrically within a main drain pipe, said housing assembly being of a given length and a given diameter with a closed bottom acting as a sediment trap and water reservoir, said housing assembly further comprising an open top with screw threads adjacent said top and formed on the interior surface of said housing assembly, flange means protruding outwardly from the side wall of said housing assembly for supporting a waterproof plug between said drain top and its site of installation, and side wall fluid passage means through the side wall of said housing assembly, and a generally cylindrical removable insert located concentrically within said housing assembly, said insert having an upper end, connecting flange means on said upper end for attachment with a second drain pipe, a lower unobstructed end, a longitudinal fluid passage means between said ends, and a length less than said given length and a diameter less than said given diameter, said removable insert being adapted to be positioned within said housing assembly and attached to said screw threads by mating screw threads adjacent the upper end of said removable insert whereby a fluid drain trap passage is defined sequentially through said insert upper end, said longitudinal passage means, around said insert lower end, through the space between the interior of said cylindrical housing assembly and the exterior of said cylindrical removable insert, and through said side wall passage means.

2. The drain trap of claim 1, wherein said removable insert has a web spaced from said connecting flange means with said mating screw threads formed thereon.

3. The drain trap of claim 2 wherein said web with screw threads thereon has a portion with a diameter that is substantially the diameter of said housing assembly and has a gasket seal surface facing a corresponding gasket seal surface on the top of said housing assembly whereby a gasket may be sealingly engaged by said gasket seal surfaces when said removable insert is attached to said housing assembly.

4. The drain trap of claim 1 wherein said removable insert has strainer web means adjacent said upper end transverse to said longitudinal passage means.

5. The drain trap of claim 4 wherein said strainer web means is spaced from said insert upper end and has strainer attaching means thereon.

6. The drain trap of claim 5 wherein the top surface of said housing assembly and the upper surface of said removable insert are in the same plane when said drain trap is assembled to provide a gasket sealing surface for a gasket that may be sealingly engaged between said gasket sealing surface and a strainer attached to said strainer attaching means.

7. The drain trap of claim 1 wherein said removable insert has a converging seating surface adjacent said upper end adapted to receive a resilient sealing plug.

* * * * *

UNITED STATES PATENT OFFICE
CERTIFICATE OF CORRECTION

Patent No. 3,751,734      Dated August 14, 1973

Inventor(s) Robert B. Lumadue

It is certified that error appears in the above-identified patent and that said Letters Patent are hereby corrected as shown below:

Column 1, lines 8, 11, 12, 16, 19 and 28:
    In each instance the U should have quotes.

Column 4, line 46 - bell should be in quotes.

Signed and sealed this 11th day of June 1974.

(SEAL)
Attest:

EDWARD M. FLETCHER, JR.
Attesting Officer

C. MARSHALL DANN
Commissioner of Patents